United States Patent
Malewicz

(10) Patent No.: US 9,552,408 B2
(45) Date of Patent: Jan. 24, 2017

(54) NEAREST NEIGHBOR CLUSTERING DETERMINATION AND ESTIMATION ALGORITHM THAT HASHES CENTROIDS INTO BUCKETS AND REDISTRIBUTES VECTORS BETWEEN CLUSTERS

(71) Applicant: Facebook, Inc., Menlo Park, CA (US)

(72) Inventor: Grzegorz Malewicz, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 471 days.

(21) Appl. No.: 14/163,751

(22) Filed: Jan. 24, 2014

(65) Prior Publication Data
US 2015/0213375 A1     Jul. 30, 2015

(51) Int. Cl.
*G06F 15/18*     (2006.01)
*G06F 17/30*     (2006.01)

(52) U.S. Cl.
CPC ... *G06F 17/30598* (2013.01); *G06F 17/30097* (2013.01)

(58) Field of Classification Search
CPC .............................................. G06F 17/30598
USPC .................................................... 706/12, 45
See application file for complete search history.

(56) References Cited

U.S. PATENT DOCUMENTS

| | | | | |
|---|---|---|---|---|
| 2009/0318802 A1* | 12/2009 | Boyden | .............. | A61B 5/02007 600/437 |
| 2011/0296374 A1* | 12/2011 | Wu | ...................... | G06F 17/2715 717/104 |
| 2014/0112572 A1* | 4/2014 | Reif | ..................... | G06K 9/6211 382/154 |
| 2015/0213112 A1 | 7/2015 | Malewicz et al. | | |

OTHER PUBLICATIONS

Can, Dynamic Cluster Maintenance, 1989, IP & M, vol. 25, No. 3, pp. 275-291.*
Yang et al., A Study on Retrospective and On-line Event Detection, 1998, ACM, pp. 28-36.*
Non-Final Office Action Mailed Sep. 9, 2016 of U.S. Appl. No. 14/163,555 by Malewicz, G. et al., filed Jan. 24, 2014.
U.S. Appl. No. 14/163,555 of Malewicz, G. et al., filed Jan. 24, 2014.
Restriction Requirement mailed Jun. 13, 2016, for U.S. Appl. No. 14/163,555 by Malewicz, G. et al., filed Jan. 24, 2014.

* cited by examiner

*Primary Examiner* — David Vincent
(74) *Attorney, Agent, or Firm* — Perkins Coie LLP

(57) ABSTRACT

Embodiments are described for determining and/or estimating a nearest neighbor to a data vector in a dataset are presented. Some embodiments redistribute data vectors between clusters based upon the character of the clusters to more evenly balance the computational load. Some embodiments employ Locality Sensitive Hashing (LSH) functions as part of the clustering and remove redundant data vectors from the data set to mitigate unbalanced computation. The disclosed embodiments may facilitate the analysis of very large and/or very high dimensional datasets with reasonable runtimes.

33 Claims, 17 Drawing Sheets

NEAREST NEIGHBOR CLUSTERING DETERMINATION AND ESTIMATION ALGORITHM THAT HASHES CENTROIDS INTO BUCKETS AND REDISTRIBUTES VECTORS BETWEEN CLUSTERS

TECHNICAL FIELD

The disclosed embodiments relate to data analysis, particularly processing distribution and efficiency, e.g., for identifying nearest neighbors in a dataset.

BACKGROUND

Large datasets are increasingly readily available from a wide variety of different domains. For example, websites regularly acquire very large datasets of consumer purchasing information, weather monitoring systems regularly acquire a wide variety of measurement data, security installations acquire a wide variety of image data, etc. Sifting through these copious datasets can be onerous and costly, but the rewards for identifying meaningful patterns and trends can be great.

Machine learning and data analysis tools offer one possible method for automating the analysis process. These tools can classify data and determine associations between different datasets. However, when the datasets become exceptionally large these tools may be unable to determine meaningful relationships in a reasonable amount of time. For example, in an application comparing images, e.g. to recognize common objects in each image, each additional image will exponentially increase the imposed load as the Nth image must be compared with each of the preceding N-1 images. For even a small 64×64 grayscale pixel image, this can be a considerable constraint (64×64=4096 dimensions per image).

Accordingly, there exists a need to more accurately and to more quickly determine associations among data points in large datasets. In particular, in many situations it would be ideal to determine or to estimate a nearest neighbor to a target data vector in a dataset quickly and efficiently.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

Figure 1:
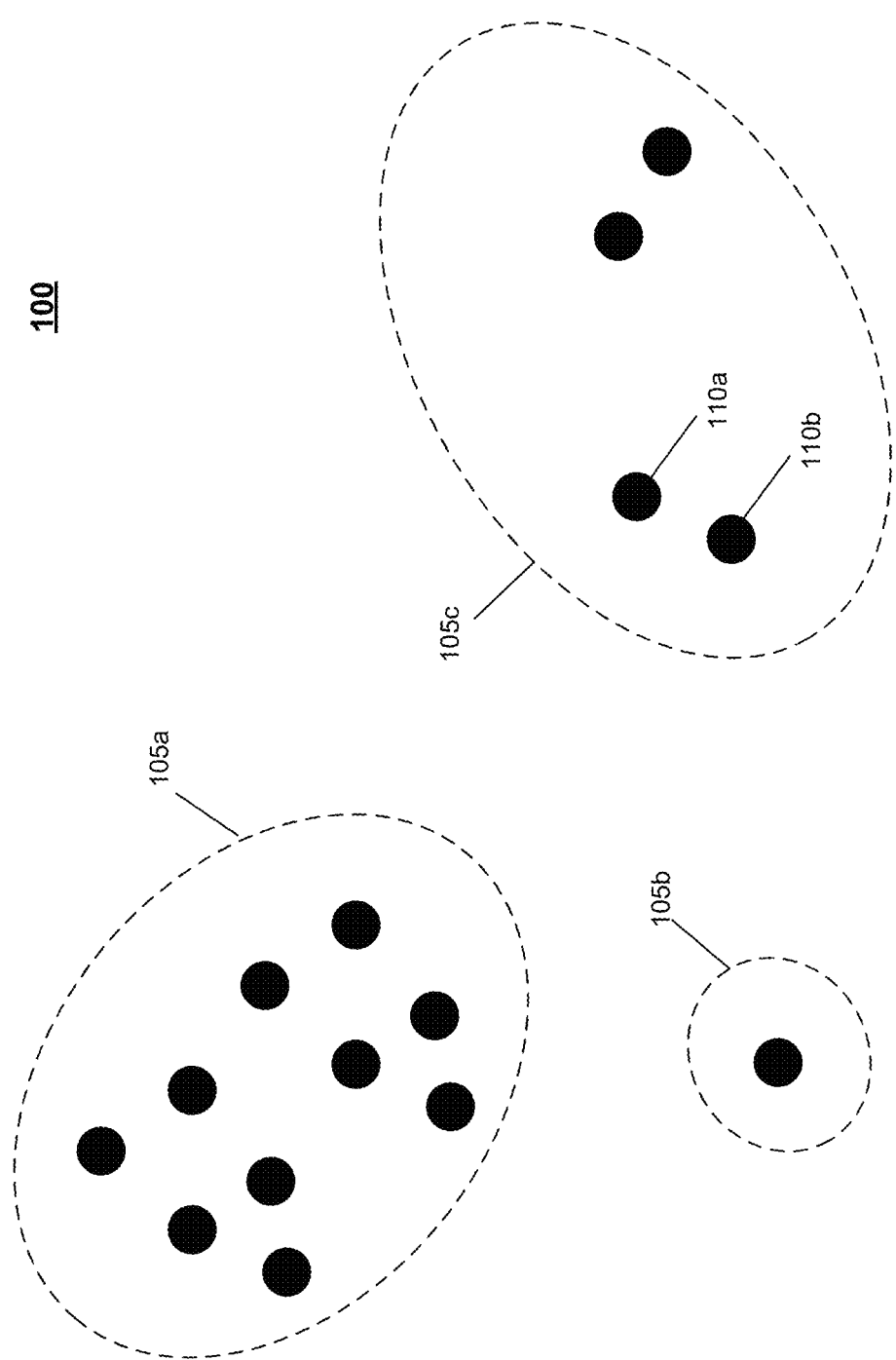
FIG. 1 is an example plot of data vectors in a two dimensional space as may be provided for a nearest neighbors search in some embodiments.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Overview

Various of the disclosed embodiments relate to determining data vectors resembling other data vectors in a dataset. For example, in some embodiments as user may desire to identify the "nearest neighbor" to a data vector, e.g., the data vector sharing the most similar values of all the data vectors in the dataset. For very large datasets it may be impractical to determine the nearest neighbor by brute force. Instead, as occurs in some embodiments, the dataset may be grouped into similar data vectors and then searches performed on these groups by a collection of distributed computing systems. In this manner, the computational load may be divided and the result may be more readily achieved.

The grouping of the data vectors may be accomplished using various clustering methods, e.g., K-means, as discussed in greater detail herein. K-means may itself be optimized using Locality Sensitive Hashing (LSH) techniques, also summarized below. Various embodiments adjust and optimize these procedures to improve their use in identifying nearest neighbors. However, in some cases the disclosed improvements extend beyond the direct application of these methods to nearest neighbors and may be used in general categorization routines.

FIG. 1 is an example plot 100 of data vectors in a two dimensional space as may be provided for a nearest neighbors search in some embodiments. In this example, the data vectors are depicted as black circles distributed across the two dimensions of the page (though one will recognize that actual datasets may comprise hundreds or thousands of dimensions). Given a target data vector 110a, a user may desire to identify a nearest neighbor, e.g., data vector 110b. Although one could identify the nearest neighbor by a brute force comparison of all the data vectors, this is generally computationally "expensive." A clustering routine, e.g., K-means, may be used to cluster groups 105a-c of data points and an analysis then performed only among data vectors in the same cluster as the target data vector, e.g., cluster 105c. While more efficient, this process may introduce errors. For example, only a single data vector is present in cluster 105b and so the system will not be able to identify the nearest neighbor for that single data vector in this approach. Optimizing the clustering of the data vectors may more efficiently produce results and may also achieve more accurate results.

General Description

Various examples of the disclosed techniques will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the techniques can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the embodiments. Indeed, certain terms may even be emphasized below; however, any terminology intended to be interpreted in any restricted manner will be overtly and specifically defined as such in this section.

K-Means Operations

Figure 2:
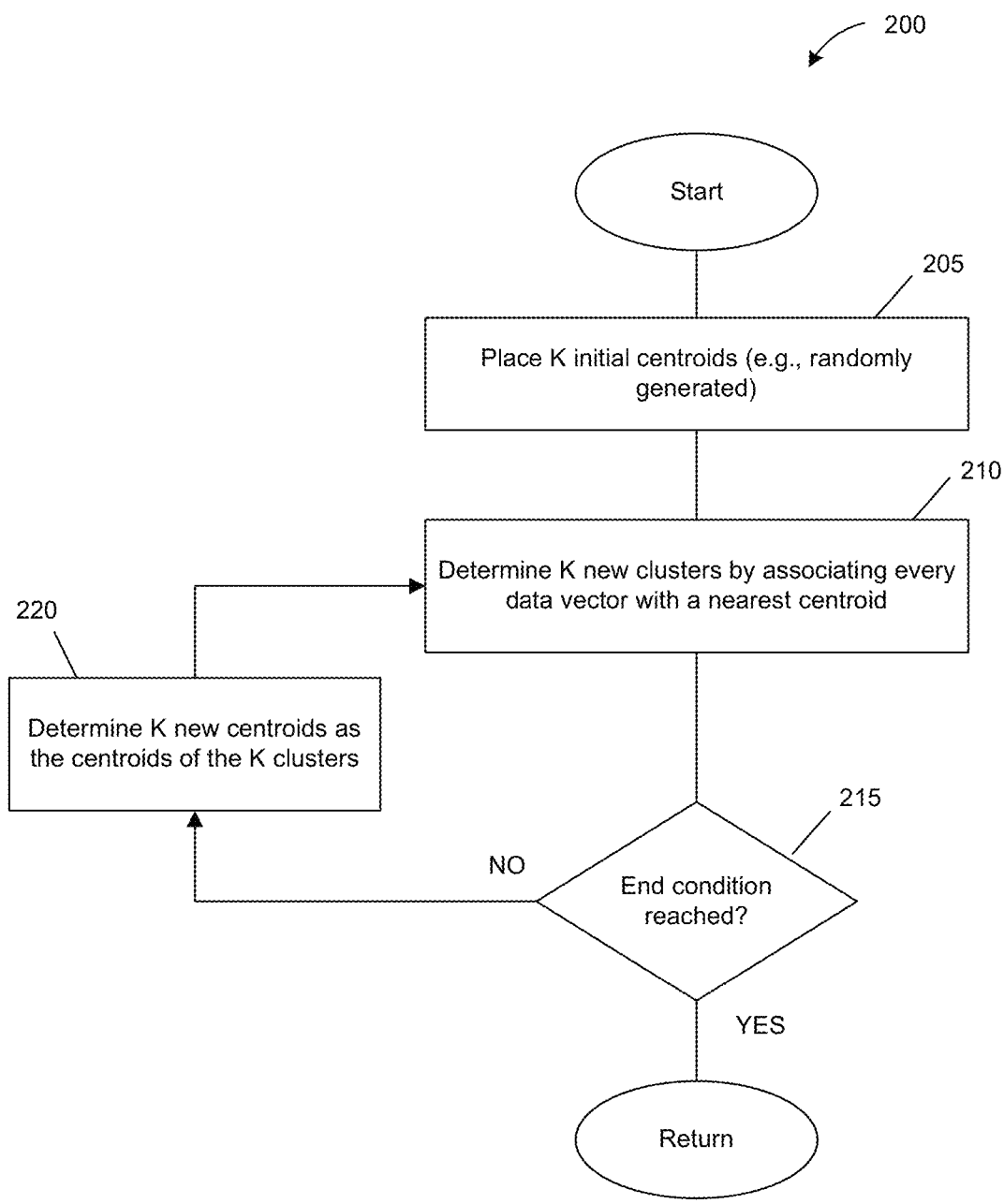
FIG. 2 is a flow diagram depicting a K-Means routine as may be implemented using various of the disclosed embodiments.

FIG. 2 is a flow diagram depicting a K-Means routine 200 as may be implemented using various of the disclosed embodiments. The K-Means routine may be used to identify groups of "similar" data, e.g., data having many near data points. The system may begin with a dataset comprising multiple data vectors. The data vectors may be high dimensional data. As one example the dataset may be a collection of 64×64 grayscale pixel images, with each vector representing an image and constituting 4096 values. A wide variety of datasets other than images may be used (e.g., word counts, time values, etc.).

Given the data, the routine 200 may generate K initial points for classification, e.g., randomly, at block 205. In subsequent iterations these points may be replaced with centroids of the respective clusters. Though referred to as a "centroid," one will recognize the terms "average," "mean," and/or "Nth-moment" as describing a similar concept. The number K of centroids may be determined based on a number of factors, e.g., the desired categorization, the nature of the data, etc.

At block 210, the routine 200 may determine K new clusters of data by associating each data vector with a nearest centroid.

At decision block 215, the routine 200 may determine if an appropriate end condition has been reached. For example, the routine may stop after a specified number of iterations, or when each successive centroid is less than a specified threshold distance from its predecessor in the previous iteration.

If the end condition has not been reached at block 215, the routine 200 may proceed to block 220 where K new centroids are determined based upon the clusters. For example, where four data vectors are associated with a cluster, the preceding centroid may be removed and the average of the data vectors' values may determine the values of a new centroid.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

Figure 3:
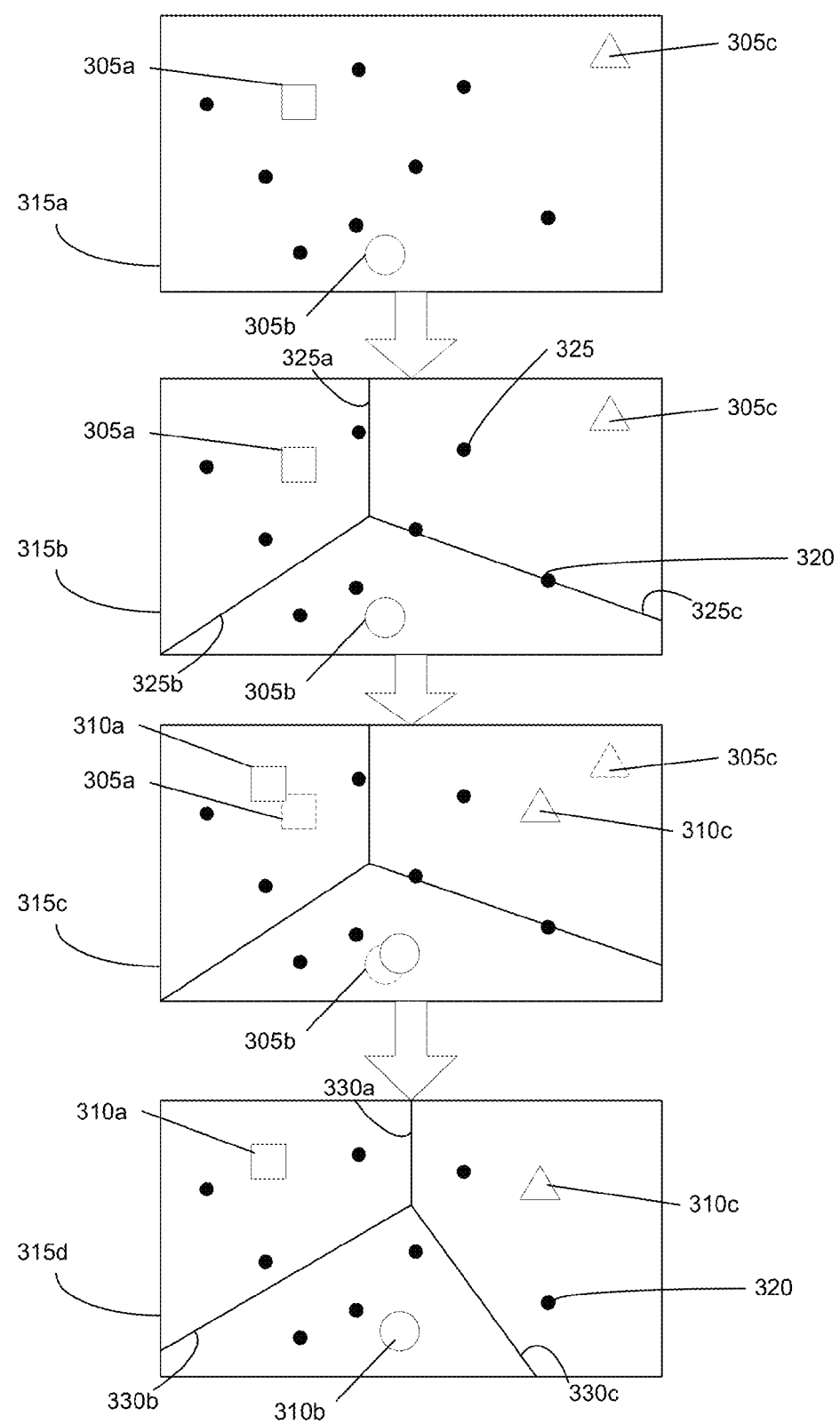
FIG. 3 is a graphical depiction of an example iteration of the K-Means routine depicted in FIG. 2.

FIG. 3 is a graphical depiction of an example iteration of the K-Means routine depicted in FIG. 2. In the 2-dimensional example of FIG. 3, at state 315a, a collection of data vectors (represented by solid black circles) may be received for categorization. Initially, three centroids 305a-c (K=3) may be randomly generated. One will recognize, as described above, that in many applications there will be many more than two dimensions of the data. State 315a generally corresponds to the result of executing the logic of block 205 of FIG. 2.

At state 315b, generally corresponding to block 210, bisectors 325a-c divide the centroids 305a-c (represented as shapes outlined with solid lines) into a Voronoi diagram. One skilled in the art will recognize a bisector 325a-c as, e.g., a line or plane dividing two regions. A Voronoi diagram is a division of a space into regions based upon a collection of points (in this example, centroids). Each region of the Voronoi diagram represents a "clustering" of data. In state 315b, the data vector 325 is clearly associated with the cluster generated around the centroid 305c. In state 315b the data vector 320 is near the bisector 325c between two clusters.

At state 315c, generally corresponding to block 220, new centroids 310a-c (represented as shapes outlined with dashed lines) are calculated based upon the data vectors for each cluster. As indicated in state 315d, the new centroids 310a-c result in a new Voronoi clustering with bisectors 330a-c. In this new clustering, the data vector 320 is farther from the bisector 330c and more clearly associated with the cluster of centroid 310c.

Application of Locality Sensitive Hashing to K-Means

While the K-means routine of FIGS. 2-3 may properly cluster the dataset, block 210 identifies a centroid nearest each data vector. A naïve, brute-force approach may be unsuitable when there are many centroids and many data vectors. Indeed, time and storage space (e.g., memory) requirements may grow exponentially with increases in the number or dimensions of the vectors.

Accordingly, some embodiments approximate the nearest centroid using Locality Sensitive Hashing (LSH). This approximation may be suitable in many instances and may greatly reduce the computation time and space. LSH is a method for performing probabilistic dimension reduction, and so may be useful for identifying similar data as it reduces the search space for identifying nearest neighbors. LSH groups similar data based upon multiple randomly generated projections. Determinations of nearest neighbors with LSH may be estimated, rather than exact, because LSH employs probabilistic methods discussed below.

LSH Features

Figure 4:
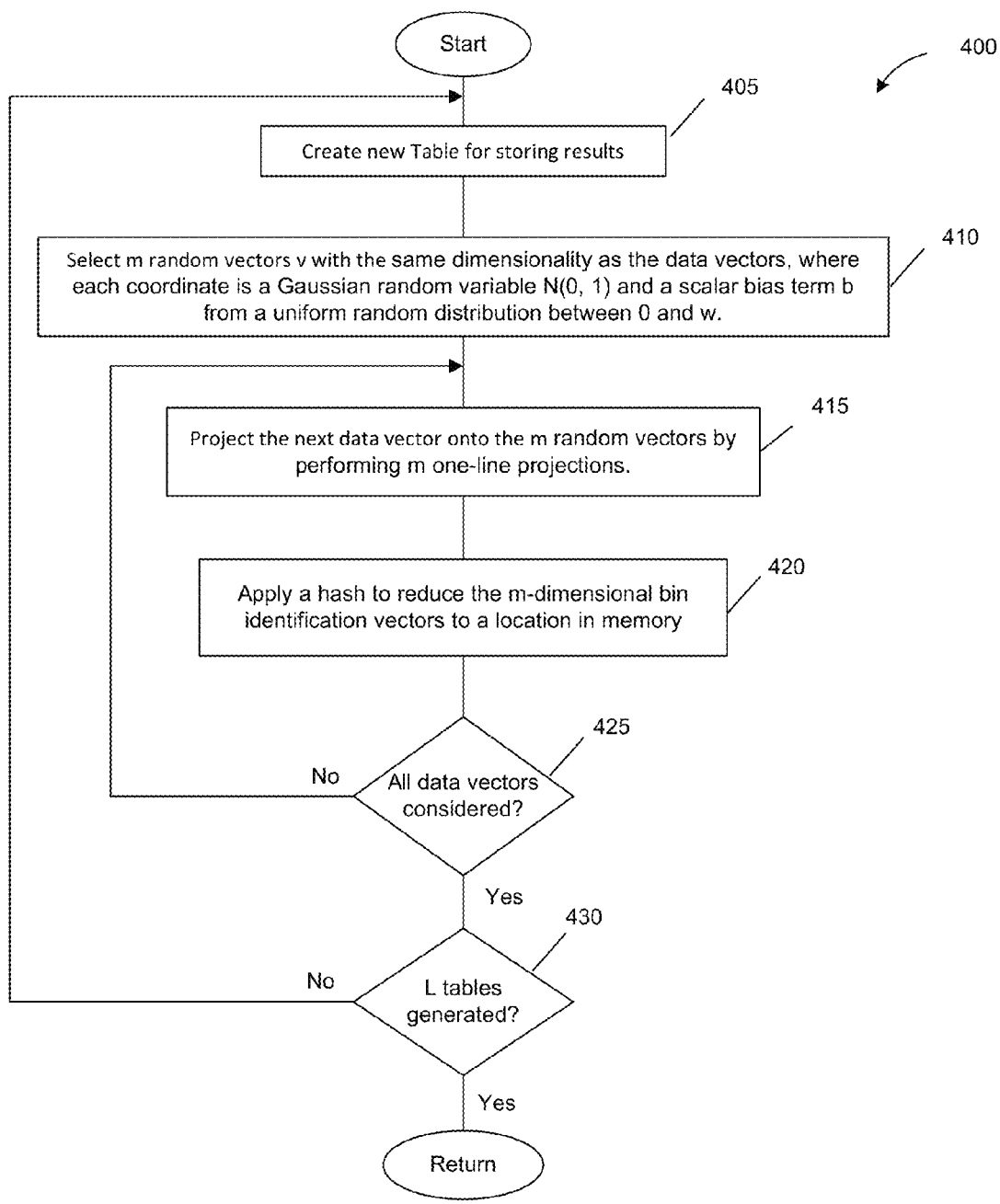
FIG. 4 is a flow diagram depicting a high-level overview of a LSH indexing routine as may be used in some embodiments.

FIG. 4 is a flow diagram illustrating a high-level overview of a LSH indexing routine 400 as may be used in some embodiments. Although for convenience the figures describe the operations as performed upon a "data vector" one will recognize that centroids may be included in the analysis as well. For example, both data vectors and centroids may be placed into bins in the described manner so that centroids nearest a given data vector may be subsequently identified. A centroid may itself be a vector, though not a data vector included in the original dataset. At block 405 the system may create a new hash table for storing results. At block 410, the system may generate m random vectors with the same dimensionality as the data vectors, e.g., where each coordinate is a Gaussian random variable N(0, 1), and optionally with a scalar bias term to reduce bias. In some embodiments, a uniform rather than a Gaussian random variable may be used without bias. Other variations will be readily recognized.

At block 415, the system may select the next data vector, project it upon each of the m random vectors based on a quantization factor w, and place it in the m-dimensional bin that corresponds to the m projections.

At block 420, the system may reduce the index of the m-dimensional bin into a one-dimensional index.

If not all the data vectors have been projected and hashed, then at decision block 425 the system may repeat the operations with the next data vector to be considered. If all the data vectors have been considered, then the system may proceed to decision block 430.

If at decision block 430 the desired number of hash tables (L) have been generated, the process may end. Conversely, if additional tables are to be generated the process blocks may be repeated from block 405 such that a new collection of hashes are generated for a new table. In this manner, successive categorizations may be performed across successive tables with randomized hashes to achieve a more accurate, aggregate categorization of the data vectors than would be achieved by a single table with a single collection of m randomized vectors.

Having performed the indexing operation of FIG. 4, embodiments may subsequently identify members of a same bin for processing. For example, given a data vector or centroid, embodiments may identify centroids/data vectors sharing the same bins as the data vector/centroid across the tables L. A nearest neighbors search may then be performed across only these similarly binned results.

Figure 5:
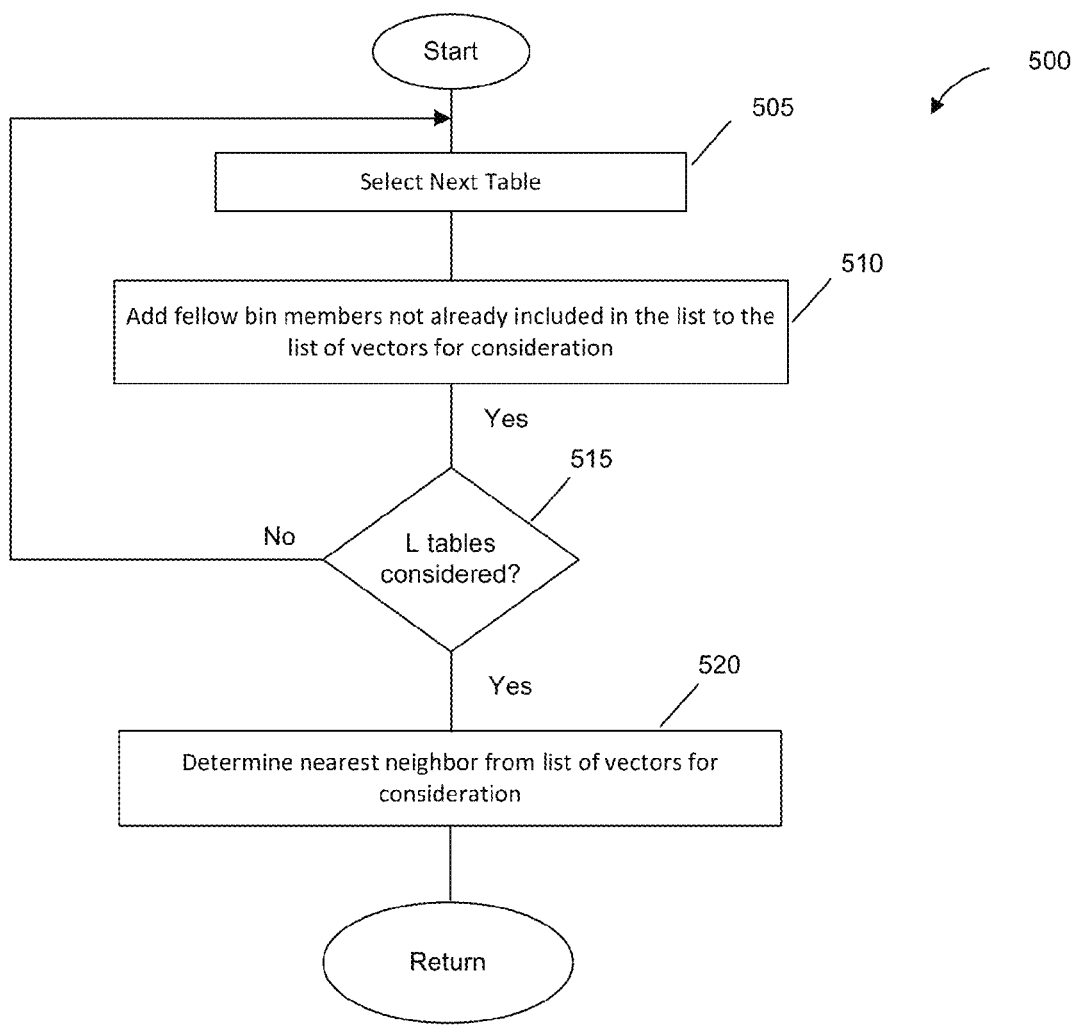
FIG. 5 is a flow diagram depicting a high-level overview of the LSH search routine as may be used in some embodiments.

FIG. 5 is a flow diagram depicting a high-level overview of the LSH search routine 500 as may be used in some embodiments. Given a "query vector" (e.g., a data vector, centroid, etc.) the search operation may identify other vectors sharing the same bin as the "query vector". At block 505, the system may select the next table among the L tables generated when indexing. At block 510, the system may identify data vectors (and/or centroids) which have been placed in the same bin as the query vector. The identified data vectors (and/or centroids) not already included in the accumulated list may be added to the list of vectors for evaluation. At decision block 515, the routine may determine if all L tables have been considered. If so, the routine continues at block 520. Otherwise, the routine returns to block 505. Once vectors that share bins with the query vector have been identified across all L tables, embodiments may perform the desired operation, e.g., calculation of the nearest neighbor at block 520 using the subset of identified vectors.

Figure 6:
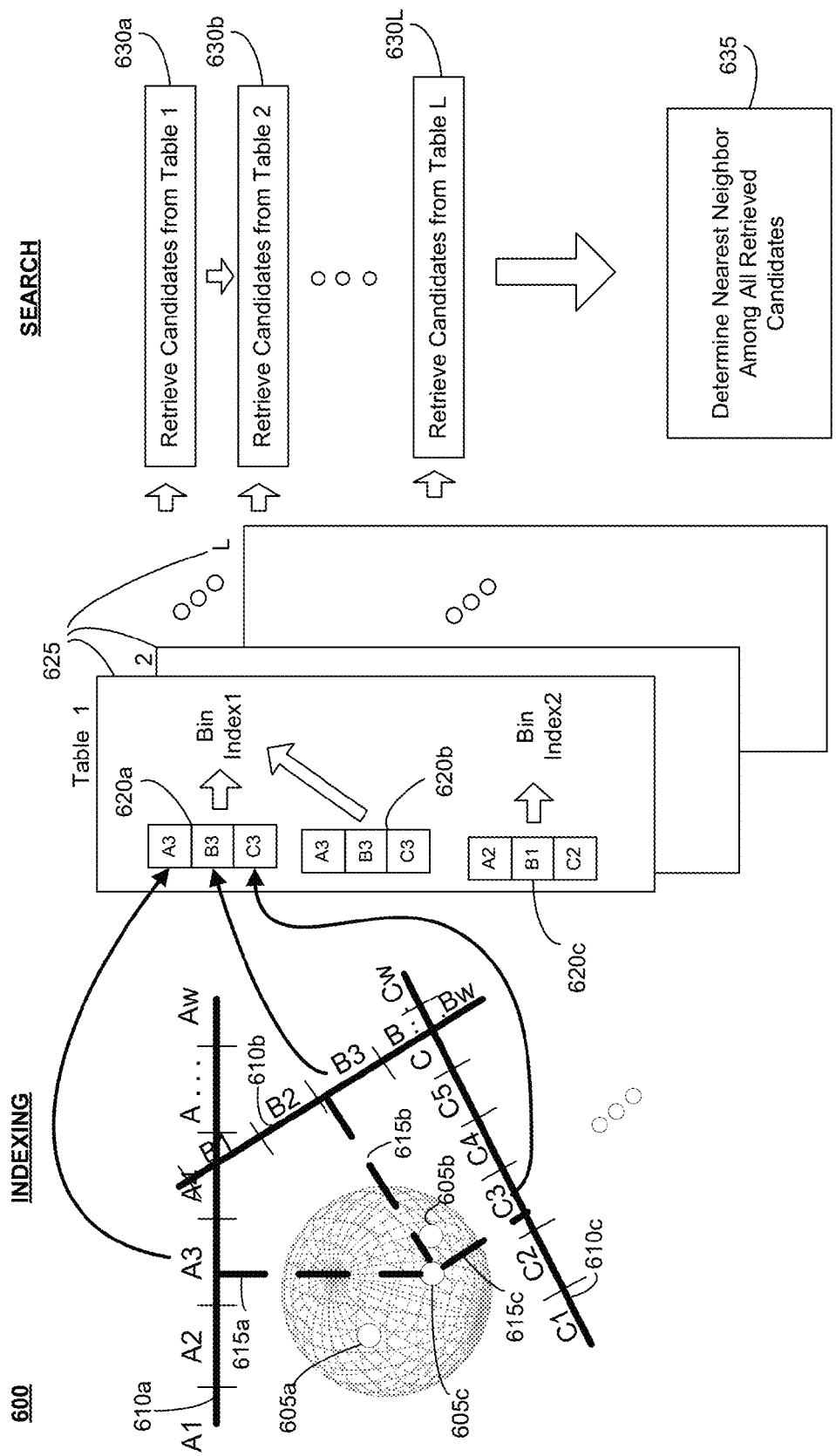
FIG. 6 is a graphical depiction of an example application of the LSH indexing and searching operations to a dataset as implemented in some embodiments.

FIG. 6 is a graphical depiction of an example application 600 of the LSH indexing and searching operations to a dataset as implemented in some embodiments. The dataset may comprise multiple data vectors 605a-c. For purposes of explanation, the indexing of the data vector 605c is depicted. Following the generation of the random vectors for projection 610a-c (m=3) the data vector 605c is projected 615a-c upon each random vector 610a-c. The random vectors 610a-c are quantized by a factor w. In view of this quantization, the data vector 605c is projected upon the regions A3, B3, and C3 of the respective random vectors 610a-c. These values 620a are hashed in Table 1 to a first Bin Index 1. The data vector 605b is sufficiently close to the data vector 605a that it may share the same projection values 620b and may accordingly be hashed to the same Bin Index 1. In contrast, the data vector 605a is sufficiently different from the other data vectors that it projects upon the regions A2, B1, and C2. These values 620c accordingly hash to a different Bin Index 2. The generation of the m vectors 610a-c, projections, and hashings is repeated for all L tables 625.

Once the L tables 625 have been generated, a data vector's fellow bin members may be identified by iterating 630a-L across each of the tables 625 (e.g., using the routine of FIG. 5). These candidates may be considered together, e.g., to identify the nearest neighbor 635 to the queried data vector.

Locality Sensitive Hashing Integration with K-Means

Figure 7:
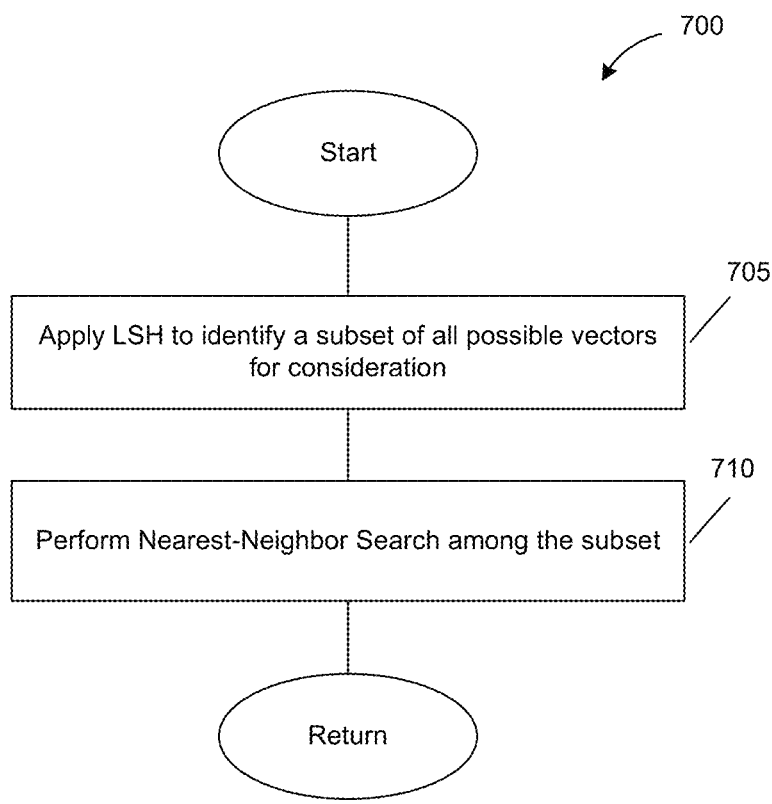
FIG. 7 is a flow diagram depicting a high-level overview of the LSH operations applied to K-means as may be used in some embodiments.

FIG. 7 is a flow diagram depicting a high-level overview of the LSH operations applied to K-means as may be used in some embodiments. The depicted operations may occur as part of, or preceding, block 210. At block 705 the system may apply LSH to identify a subset of all possible vectors for consideration, e.g., when determining a nearest centroid to a data vector. Once the subset has been determined using LSH, at block 710 a nearest neighbor search need be performed only among the subset. For example, at block 210 the system may determine which of 10,000 centroids a target data vector is closest to (e.g., when clustering images of faces among 10,000 individuals). In this example, LSH may identify only 80 centroids as being within the same bin as the target data vector. Thus, the system may only identify the nearest centroid from this 80 centroid subset to classify the data vector. Unfortunately, LSH is an approximation and the 80 centroids may exclude the actual, closest centroid. Accordingly, as discussed in greater detail below, various embodiments address and compensate for errors produced by LSH to achieve a more accurate result. Various of the disclosed embodiments apply improvements upon LSH and K-Means as described in the co-pending application CLUSTERING USING LOCALITY-SENSITIVE HASHING WITH IMPROVED COST MODEL, filed on the same day as this filing and incorporated by reference herein in its entirety for all purposes. Various of the improvements of this incorporated application may be used with LSH as part of the K-means process, or with LSH as LSH is used independently in other applications.

Example Nearest Neighbor Computational Distribution

Figure 8:
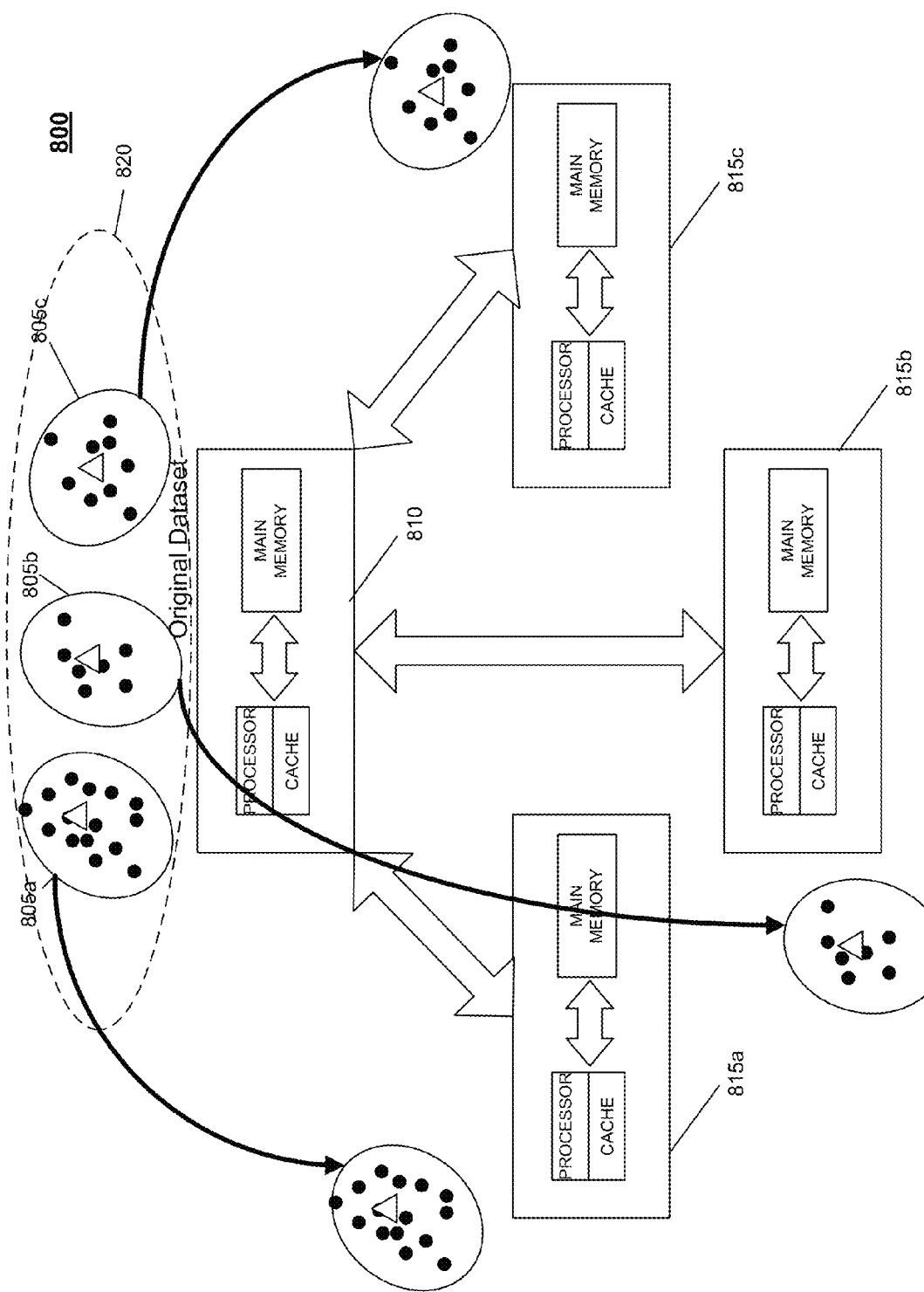
FIG. 8 is an example block diagram of the processing distribution of the nearest neighbors determination as may occur in some embodiments.

FIG. 8 is an example block diagram of the processing distribution 800 of the nearest neighbors determination as may occur in some embodiments. An original dataset 820 may be provided to the system having the data vectors depicted by black circles in the figure. A primary processing system 810, or a separate system assisting the primary processing system 810, may group the data vectors into clusters 805*a-c*, e.g., by using K-means or another grouping routine. The primary processing system 810, may then distribute the clusters for nearest neighbor identification. For example, the cluster 805*a* may be distributed to processing system 815*a* for analysis, the cluster 805*b* may be distributed to processing system 815*b* for analysis, and the cluster 805*c* may be distributed to processing system 815*c* for analysis. Processing systems 815*a-c* may then report the results of their analysis, e.g., back to primary processing system 810 or output to a user. Processing systems 810, 815*a-c* may be the same or similar as the system described with respect to FIG. 17.

In some instances, however, the number of data vectors within the clusters 805*a*, referred to as the "cardinality" of the cluster, may vary considerably. If one cluster contains only a few data vectors while another contains 100× more, there may be little benefit to distributing the two cluster's computation across separate processing systems. Rather, it would probably be desirable to more evenly distribute the data vectors among the clusters so that computation is more evenly distributed across the processing systems 815*a-c*. Naturally, one will recognize topologies other than the example of FIG. 8 in which various of the disclosed embodiments may apply.

Cluster Data Vector Redistribution

Figure 9:
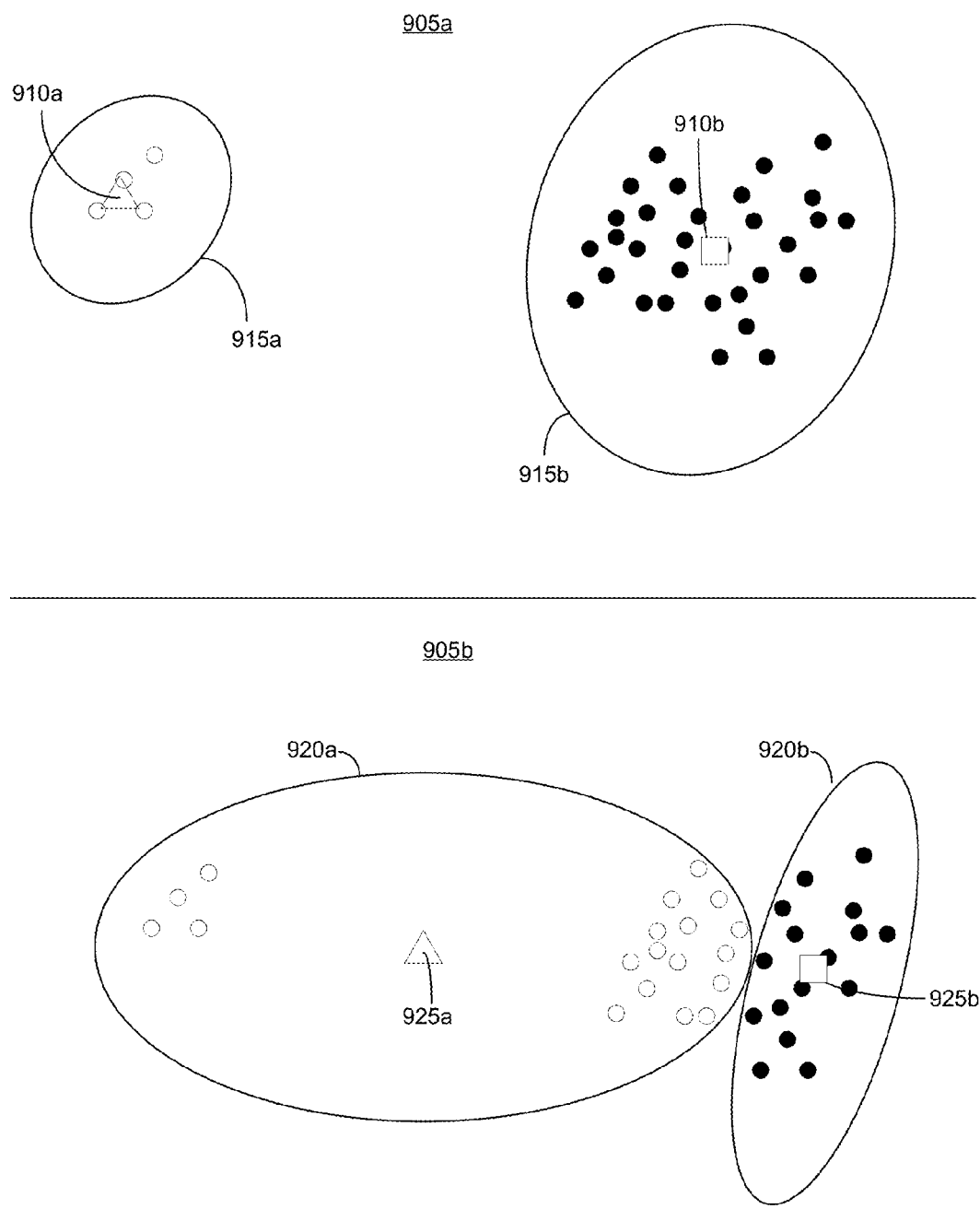
FIG. 9 is an example redistribution of clustered points via a distance-based reassignment as may be used in some embodiments.

FIG. 9 is an example redistribution of clustered points via a distance-based reassignment as may be used in some embodiments. In this example, initially in state 905*a* a handful of data vectors are associated with the cluster 915*a*, which is associated with centroid 910*a* (e.g., following a K-means iteration). Conversely, a much larger number of data vectors is associated with the cluster 915*b* associated with centroid 910*b*. To more evenly distribute computation, data vectors in the cluster 915*b* may be re-associated with data vectors in the cluster 915*a*.

Figure 10:
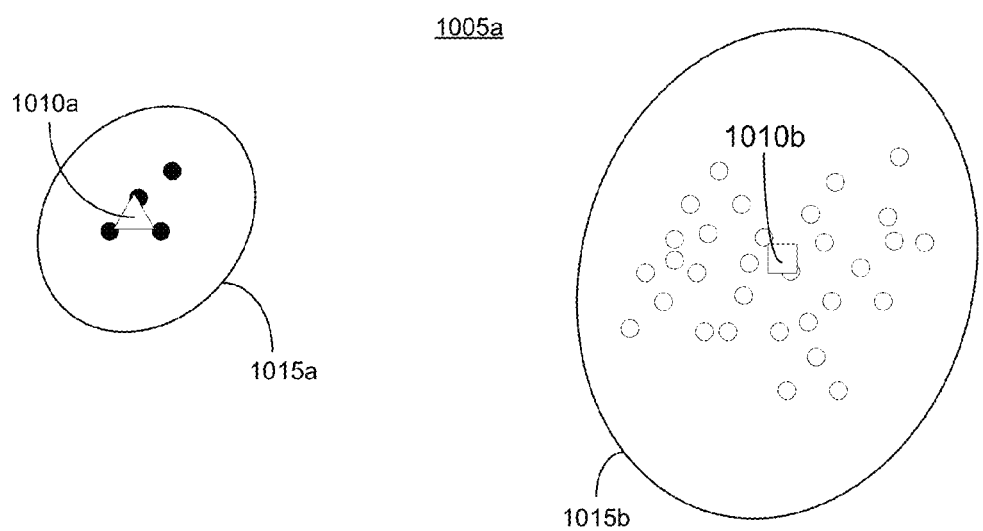
FIG. 10 is an example redistribution of clustered points via a random reassignment as may be used in some embodiments.
Figure 10:
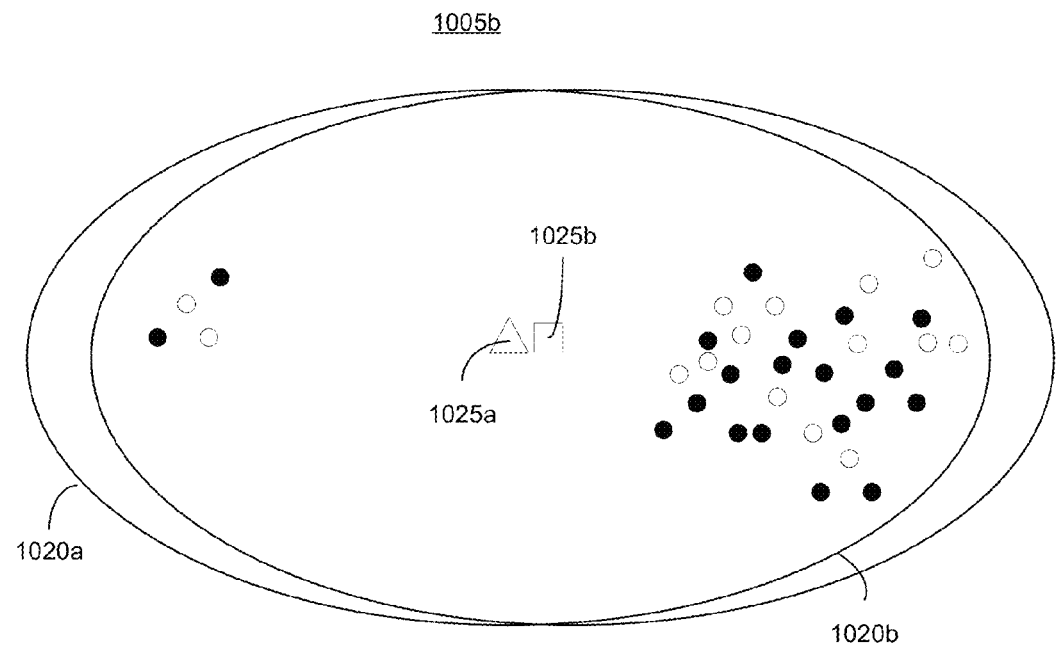

Naturally, there are many, many ways to redistribute the data vectors once the desirability of the redistribution has been identified. FIGS. 9 and 10 provide two possible examples. In FIG. 9 the distance of the data vectors is taken into consideration and in the state 905*b* a new cluster 920*a* with centroid 925*a* may be created which integrates data vectors from the previous clusters 915*a* and 915*b*. Though the terms "new" and "previous" may be used herein in regard to clusters, one will recognize that in an actual implementation the same data structures may be reused rather than recreated (e.g., a cluster objects contents may be redefined, or a parameter depicting cluster association in a data vector may be modified).

While consideration of the distance during redistribution as in FIG. 9 may improve accuracy in some instances, it may be too computationally expensive in some cases. Accordingly, in some cases it may be more efficient to redistribute the data vectors randomly following identification. FIG. 10 is an example redistribution of clustered points via a random reassignment as may be used in some embodiments. As in the example of FIG. 9, in state 1005*a* two clusters 1015*a* and 1015*b* have been identified for redistribution. Following redistribution in state 1005*a*, the data vectors have been randomly reassigned to each cluster (indicated by the white and black circles). As a consequence, the centroids of the two new clusters 1020*a* and 1020*b* may be roughly co-located. In some embodiments, the system may seek to ensure that roughly half of the cumulative data vectors are assigned to one cluster and half are assigned to the other.

Other variations of the example redistribution methods of FIGS. 9 and 10 will be readily recognized by one skilled in the art.

Example Process for Clustering Redistribution

Figure 11:
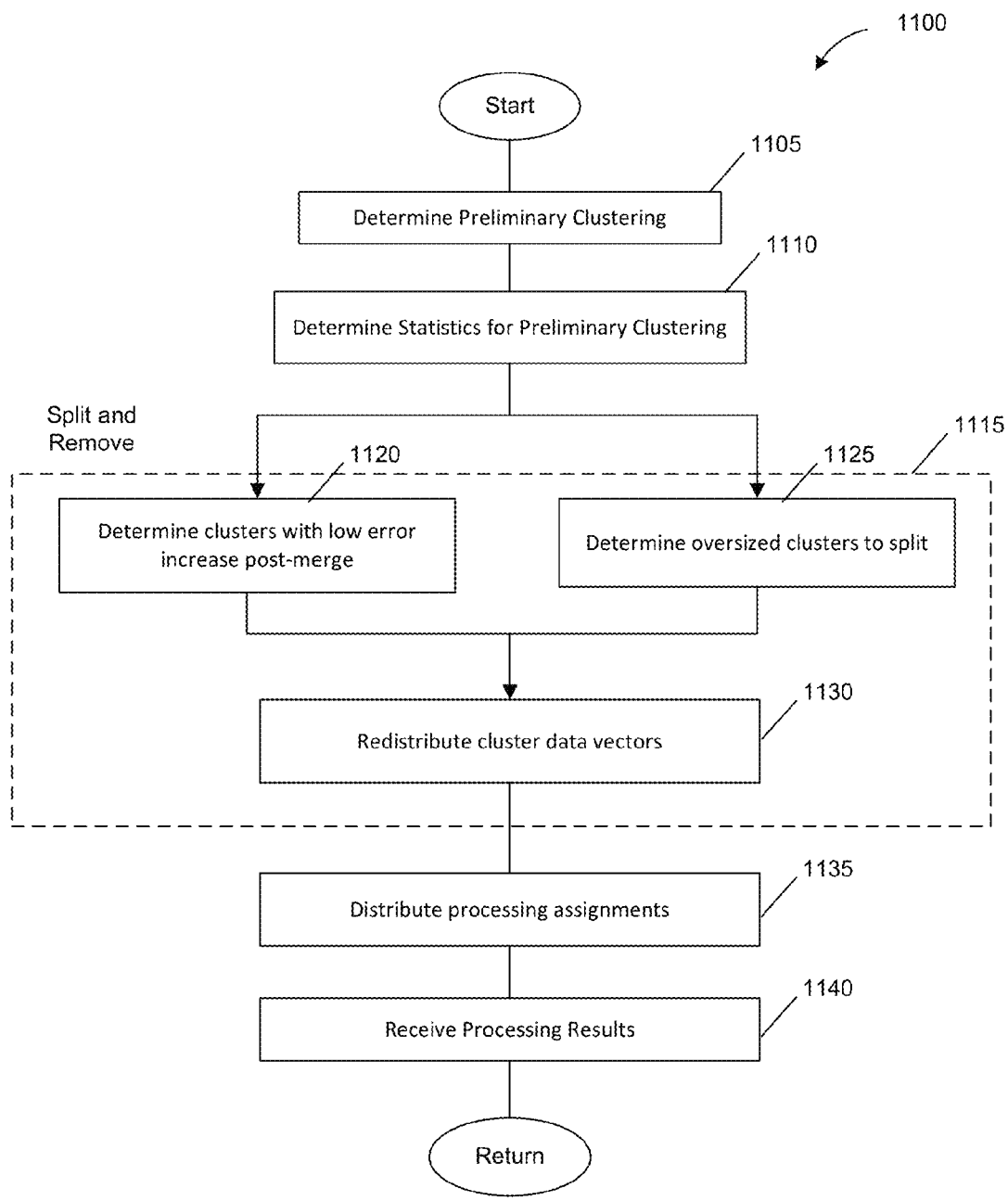
FIG. 11 is a flow diagram depicting a nearest neighbor determination as may occur in some embodiments.

FIG. 11 is a flow diagram depicting a nearest neighbor determination as may occur in some embodiments.

After receiving a dataset, at block 1105 the system (e.g., the primary processing system 810) may determine a preliminary clustering of the data (e.g., by applying K-means). At block 1110, the system may determine statistics for the preliminary clustering. For example, as described in greater detail with respect to FIG. 12, the second closest centroid, cardinality, and other features of the clusters may be determined. In some embodiments, these statistics may be made available as part of the preliminary clustering process.

The blocks contained in region 1115, may be part of a "split and remove" operation (though, as discussed above, clusters may simply be redefined rather than new cluster categorizations created and old cluster categorizations removed). In the blocks in region 1115, clusters may be identified as being "too large" and in need of redistribution of their contents ("splitting"). Conversely, clusters can also be identified who may accept the data vectors being removed. In some embodiments, these clusters are identified based on the potential error introduced by their receiving additional data vectors.

Accordingly, at block 1125 the system may identify oversized clusters to split. At block 1120, the system may also identify clusters who may receive additional data vectors while minimizing any consequential error. The identification may be based, at least in part, upon the statistics acquired at block 1110. Once appropriate data clusters have been identified, the system may redistribute their data vectors as block 1130.

The redistributed clusters may then be passed to the distributed processing systems (e.g., 815*a-c*) at block 1135. As discussed above, the results may then be received back at the primary processing system at block 1140, e.g. for consolidation, or provided directly to a user.

Cluster Statistics

Figure 12:
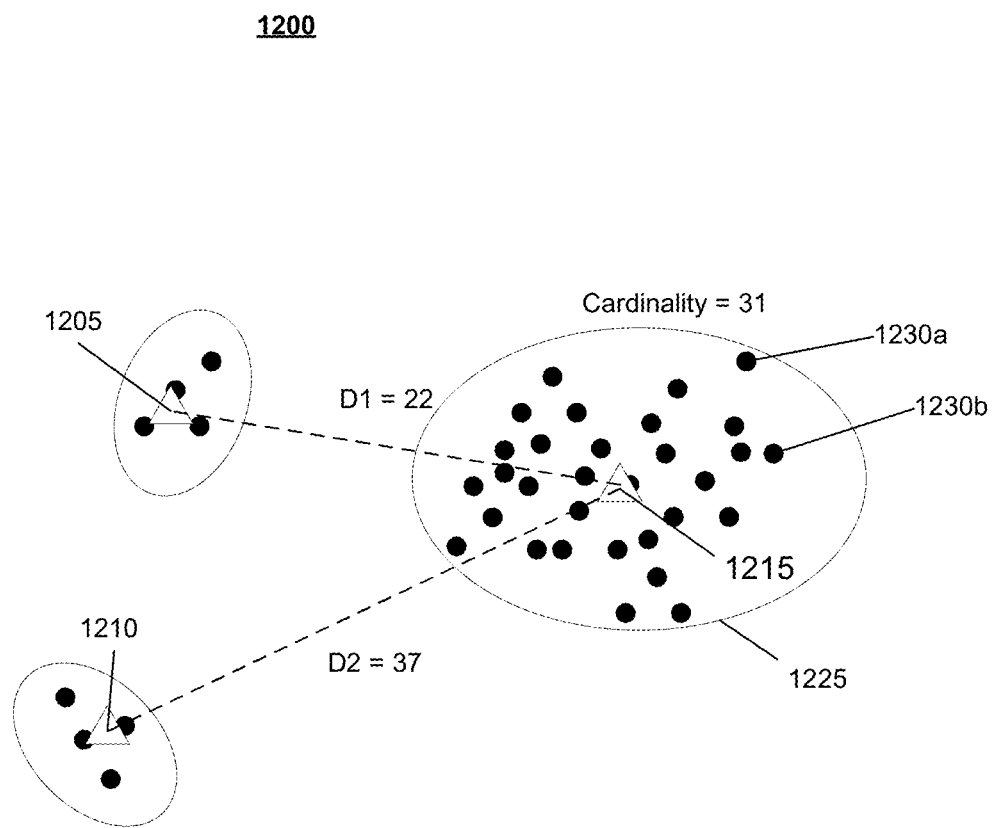
FIG. 12 is an example plot depicting certain clustering statistics as may be used in some embodiments.

FIG. 12 is an example plot depicting certain clustering statistics as may be used in some embodiments. For example, certain of these statistics may be collected at block 1110. For a cluster 1225, the cardinality of the cluster (in this example 31) may be determined and stored for later use. In addition, statistics may be collected to determine what error may result if the cluster were used to receive another cluster's data vectors. One metric for assessing this potential error, is to determine the distance to the second-closest centroid. In this example, the first closest centroid to the centroid 1215 is centroid 1205 (distance D1=22) and the second closest centroid is centroid 1210 (distance D2 which is 37).

The depicted example of FIG. 12 illustrates the calculation of the first and second closest centroids relative to the centroid 1215 of a cluster. In some embodiments, this single determination will be reused for all the vectors in cluster 1225. However, in other embodiments a more granular approach may be taken, wherein the first and second closest centroids are separately determined for each of vectors in the cluster 1225. For example, vector 1230*a* may be associated with a first and second closest centroid pair which may or may not be the same as that associated with vector 1230*b*.

Determination of the second closest centroid may itself involve a nearest neighbors search (e.g., even a distributed search as the one described herein). Optimizations, e.g., LSH, may be applied and optimizations to LSH, e.g., as are discussed herein or incorporated by reference, may also be used to improve the identification the first and/or second closest centroid to a cluster.

Example Clustering Module

Figure 13:
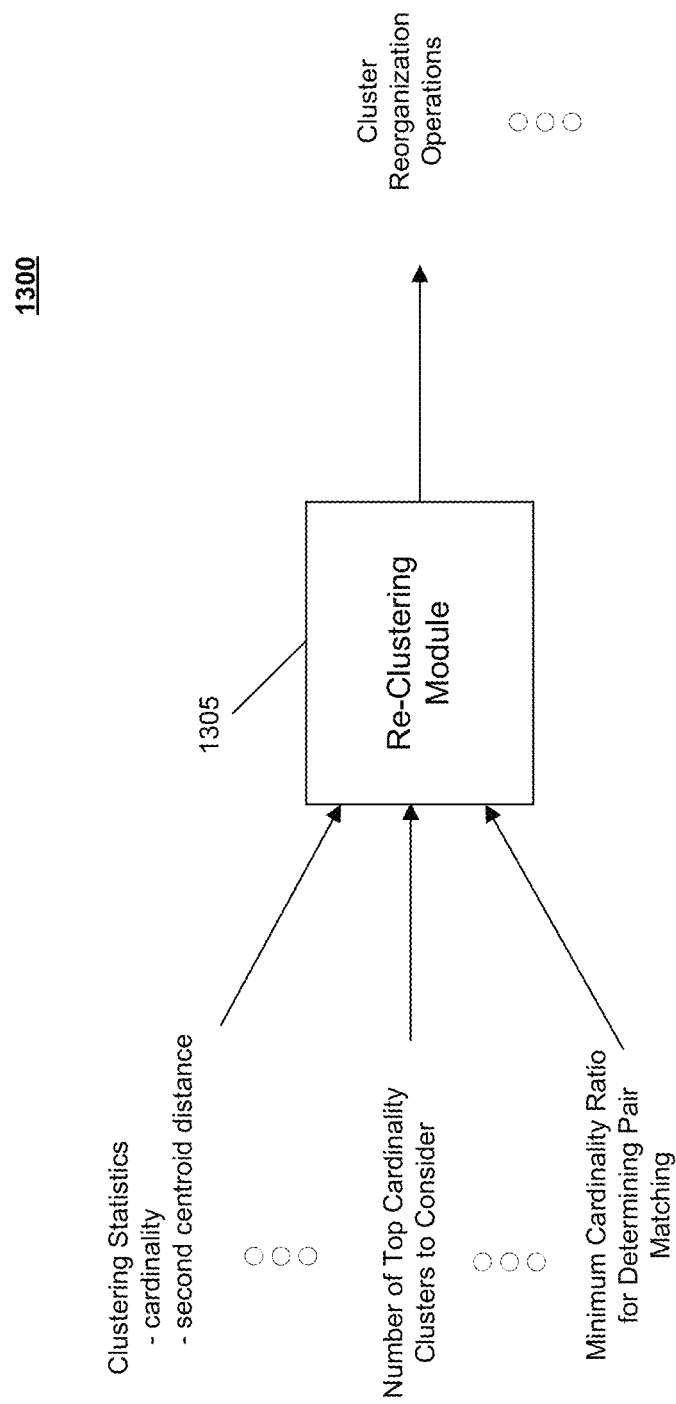
FIG. 13 is a block diagram of a re-clustering module as may be implemented in some embodiments.

FIG. 13 is a block diagram of a re-clustering module 1305 as may be implemented in some embodiments. The re-clustering module 1305 may comprise firmware, software, or hardware (e.g., an FPGA) configured to perform operations from FIG. 14. The re-clustering module 1305 may receive one or more inputs, which may include clustering statistics, a threshold on the number of "top cardinality clusters" to consider and a minimum cardinality ratio for determining pair matching (between oversized clusters and clusters able to receive addition data vectors). One will recognize that the inputs may take a variety of different forms (e.g., an absolute value rather than a ratio, a function, etc.). Similarly, the inputs may be provided via a user or via automation.

The clustering statistics may include various data, e.g., the cardinality of a cluster, and the distance to the second-closest centroid of another cluster, e.g., as described in FIG. 12. In embodiments where pairs of first and second closest centroids are identified for each individual vector in a cluster, as discussed in FIG. 12, the sum of distances to the second closest centroid (across the vectors of the cluster) may be included in the statistics rather than a single pairing for the entire cluster. The number of top-cardinality clusters may be used to indicate how many of the largest clusters are to be redistributed. For example, if past experience indicates that 10-12 large clusters result for a given domain, this parameter may be set to 10 or 12. The minimum cardinality ratio minimizes errors resulting from the redistribution by imposing a constraint on which smaller clusters can be selected for redistribution with the data vectors of a larger cluster.

One will recognize that the top-cardinality clusters parameter is complementary in some respects to the minimum cardinality ratio parameter. That is, the former addresses the issue of too large clusters, while the latter ensures that the data vectors are redistributed in an error-minimizing manner. One will readily recognize other forms these complementary parameters may take. For example, a maximum cardinality value may instead indicate the cardinality size above which all clusters are to be split. Similarly, a minimum error metric based on centroid distance, rather than the cardinality ratio, may be used in lieu, or in conjunction with, the minimum cardinality ratio. Accordingly, the module 1305 may generally receive two complementary parameters identifying a feature of the maximum cardinality clusters and of the clusters for receiving excessive data vectors.

In some embodiments, the module 1305 may perform the cluster redistributions itself. In others, as depicted, the module may output an indication of the redistribution operations to be performed and another module or system may actually implement the adjustments. Other outputs, e.g. regarding the computational efficiency, may also be output for feedback determinations.

Example Process for Cluster Selection and Adjustment

Figure 14:
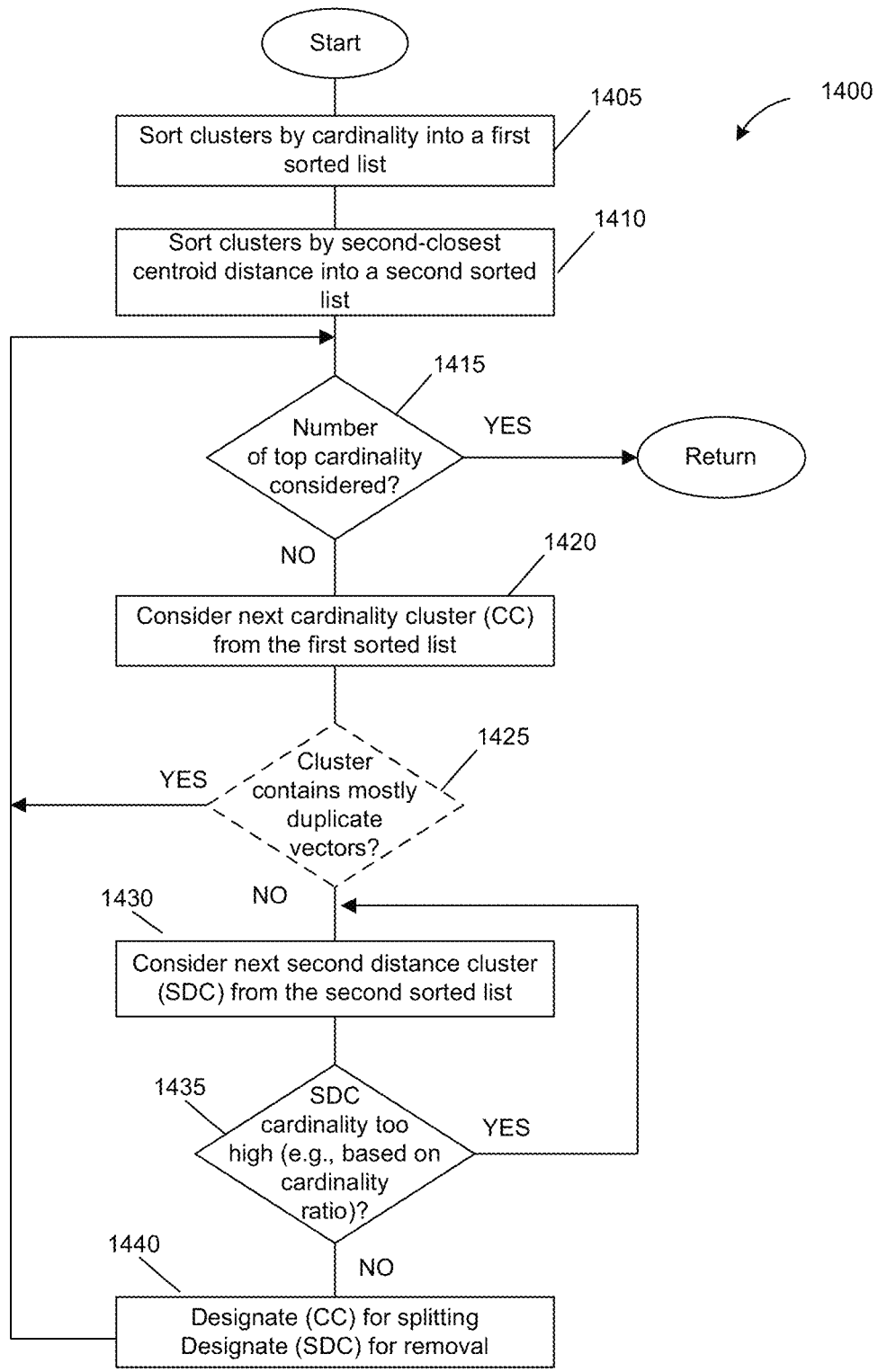
FIG. 14 is a flow diagram depicting a re-clustering operation as may occur in some embodiments.

FIG. 14 is a flow diagram depicting a re-clustering operation 1400 as may occur in some embodiments. The depicted operation 1400 is merely one example and one will recognize that variations in the depicted processes may have the same or similar effect. At block 1405 the system may sort the clusters by cardinality into a sorted list, e.g., using the cluster statistics. At block 1410 the system may sort the clusters by the second closest centroid distances (either the distance associated with the centroid of the cluster or the accumulated distance for each vector in the cluster) into a second sorted list, again, e.g., using the cluster statistics.

At decision block 1415 the system may determine whether it has addressed the desired number or type of high-cardinality clusters specified via an input parameter. In this instance, the system considers if the maximum number of top-cardinality clusters have been considered (for example, where the top-cardinality input parameter is 15, the first 15 largest clusters of the first list). If so, the process returns.

Alternatively, at block 1420 the system may consider the next highest cardinality cluster, referred to as a "cardinality cluster" (CC), from the first ordered list. As discussed in greater detail below, the CC may be set aside at decision block 1425 if it contains too many duplicate vectors. Whether the set-aside CC is considered as one of the clusters contributing to reaching the top-cardinality threshold is a design choice left to the implementer (in some embodiments the omitted cluster contributes, and in others does not). At block 1430 the next cluster from the second sorted list, referred to as a "second distance cluster" (SDC) may be considered. If the SDC's cardinality is too great relative to the CC, as based, e.g., on an input parameter (e.g. a cardinality ratio between the two clusters), the SDC may be set aside in favor of another cluster at decision block 1435.

Additional matching algorithms may be considered in some embodiments. For example, the problem may be reformulated as "bipartite matching" where the left partition contains the high cardinality clusters and the right partition contains low sum second centroid clusters. Weights between the left and right values may capture how much cardinality balance will improve and how much error will be added consequently from an adjustment (for example by a linear combination of the two). A standard bipartite matching algorithm may then be used to determine which clusters to split and which to remove.

Alternatively, at block 1440, if the cardinality relation is acceptable, the system may designate the CC for "splitting" and the SDC for "removal". As discussed above, the same, or similar redistribution may be achieved by a variety of methods (See, e.g., FIGS. 9 and 10) and the clusters may not be literally "split" or "removed", but the constituent data vectors reassigned to achieve the desired effect.

Redundant Vectors

Various of the embodiments employ further optimizations to the nearest-neighbor determination, either prior or during redistribution, or once the cluster has been delivered to processing system 815a for analysis. One optimization employed in some embodiments is the identification and removal of "redundant vectors".

Figure 15:
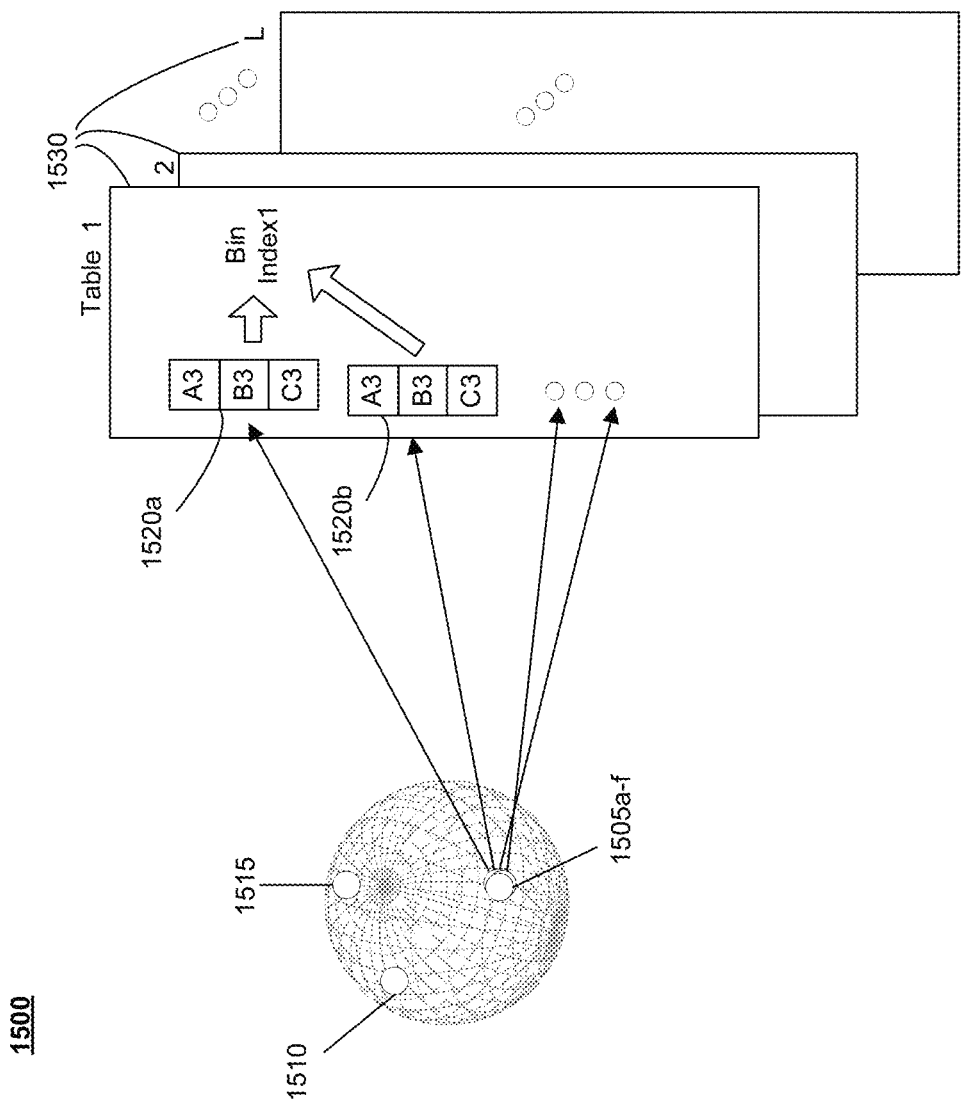
FIG. 15 is a block diagram depicting redundant vector behavior in LSH as may occur in some embodiments.

Despite the high dimensionality of many datasets, in some instances several of the data vectors may have identical, or near identical values. These redundant vectors may adversely influence the computation of the nearest neighbors in some instances. For example, FIG. 15 is a block diagram depicting redundant vector behavior in LSH as may occur in some embodiments. As discussed in FIG. 6 the data vectors may be iteratively projected and indexed as part of the LSH process. As discussed herein, various embodiments employ an improved LSH process, e.g., as part of the K-means calculation, which may itself be used for nearest-neighbor determination or for cluster redistribution, as discussed in the application incorporated by reference above.

In FIG. 15, the data vectors 1510 and 1515, are relatively dispersed. However, the data vectors 1505a-f generally share the same or similar values. As a consequence, during LSH each of the data vectors 1505$a$-$f$ will be projected onto a same quantized bins 1520$a$-$b$ of a plurality of random vectors 610$a$-$c$. Again, and again, through many or all iterations of the tables 1530, these redundant vectors may fall within the same bin index. Such repetition may adversely weight the LSH calculation and result in an unbalanced computation. In some embodiments, the existence of redundant vectors is determined, and the redundancy reduced to a single representative vector to mitigate the problem. This improvement may be applied wherever LSH is used as discussed herein, e.g., during K-means calculations, second nearest centroid determination, nearest-neighbor identification, etc.

Figure 16:
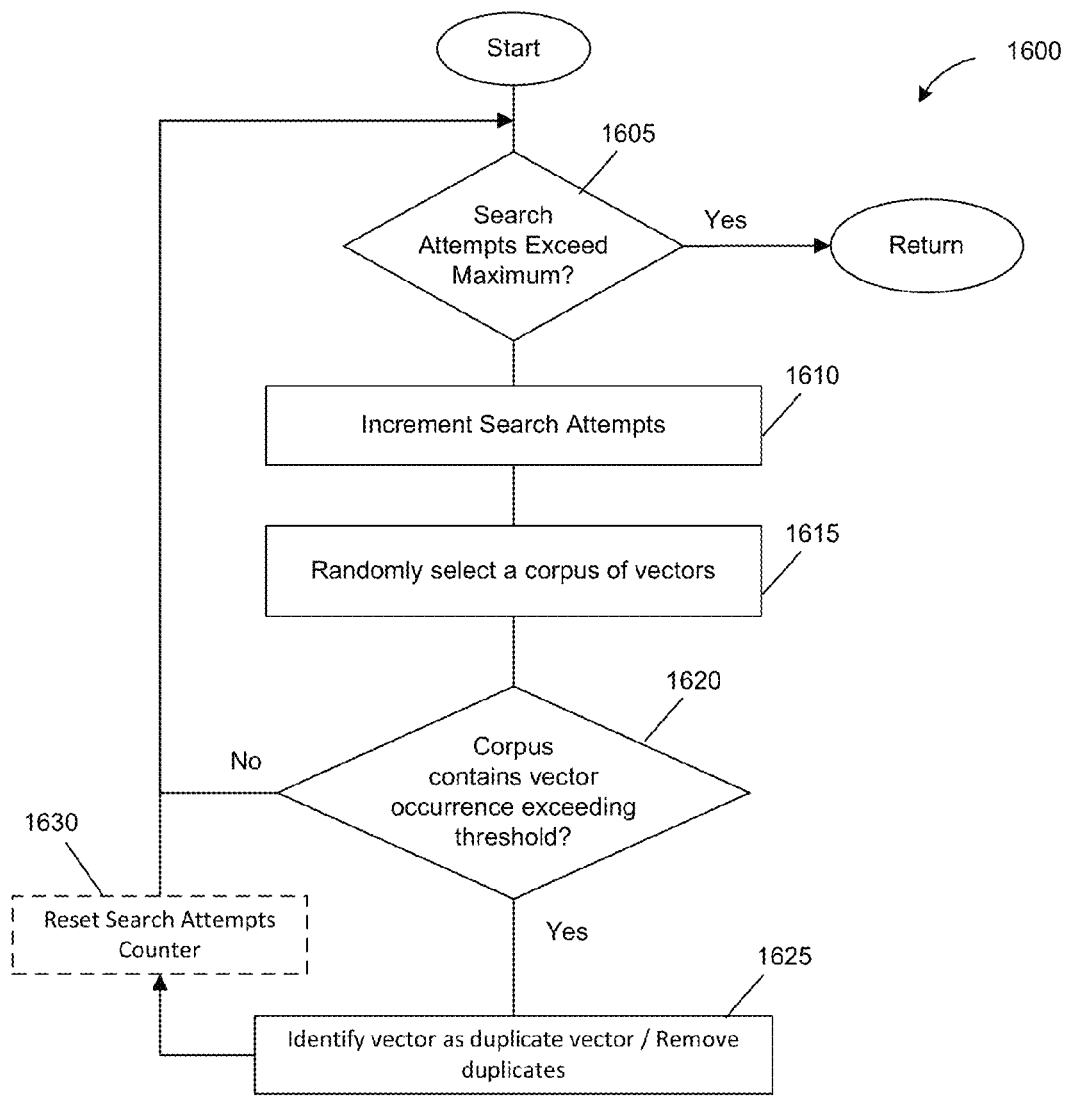
FIG. 16 is a flow diagram for a process for identifying and optionally removing redundant vectors as may occur in some embodiments.

FIG. 16 is a flow diagram for a process 1600 for identifying and optionally removing redundant vectors as may occur in some embodiments. This is merely one possible example implementation and one will readily recognize variations to achieve the same or similar effect. At decision block 1605, the system may determine whether enough search attempts have been made to identify redundant vectors, e.g., based upon a user input or an automated appraisal of the cluster's character.

If additional searches are to be performed, at block 1610 the system may increment the record of the number of search attempts. At block 1615 the system may randomly select a corpus of data vectors from the data set under consideration (for example, a subset comprising 5% of all the data vectors). Within this corpus, the system may seek to identify redundant vectors at decision block 1620. Where the randomly selected corpus is representative of the data set as a whole, the existence of redundancies in the corpus will reflect additional redundancies in the entire data set. If such redundancies are identified in the corpus (e.g., in excess of a threshold), at block 1625 the system may identify the data vector as a duplicate. Simultaneously, or in conjunction with another system, the redundant vectors may be removed throughout the entire data set, so that, e.g., only a single representative remains. LSH may then be applied as described above to the dataset. In some embodiments, the system may find at most one redundant vector per cluster to improve efficiency.

At block 1630 the system may decide to begin the search anew, for example, by resetting the search attempts counter after a redundant vector has been identified. In this manner, if multiple classes of redundant vectors exist (a first repeating a first set of values, a second repeating a second set of values, etc.) they may each be successively identified and removed before applying LSH.

Computer System

Figure 17:
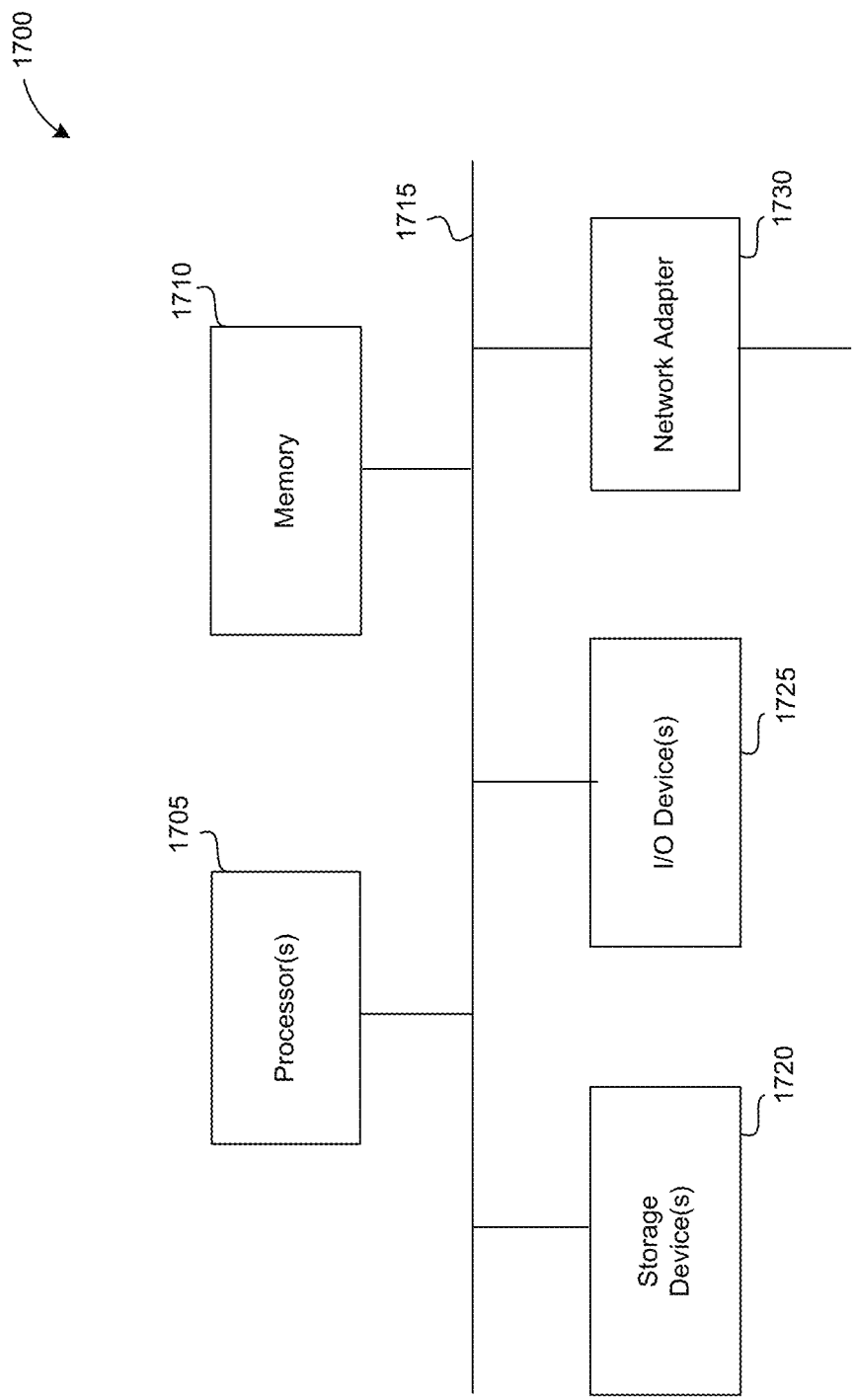
FIG. 17 is a block diagram of a computer system as may be used to implement features of some of the embodiments.

FIG. 17 is a block diagram of a computer system as may be used to implement features of some of the embodiments. The computing system 1700 may include one or more central processing units ("processors") 1705, memory 1710, input/output devices 1725 (e.g., keyboard and pointing devices, display devices), storage devices 1720 (e.g., disk drives), and network adapters 1730 (e.g., network interfaces) that are connected to an interconnect 1715. The interconnect 1715 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1710 and storage devices 1720 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 1710 can be implemented as software and/or firmware to program the processor(s) 1705 to carry out actions described above. In some embodiments, such software or firmware may be initially provided to the processing system 1700 by downloading it from a remote system through the computing system 1700 (e.g., via network adapter 1730).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is Claimed is:

1. A computer-implemented method for estimating a nearest neighbor to a target data vector in a dataset, comprising:
    receiving, by a computer system, a request to determine the nearest neighbor to the target data vector;
    determining, by the computer system, a preliminary clustering of the dataset, the preliminary clustering comprising multiple preliminary clusters, the determining including:
        for an initial set of clusters of the dataset, computing a centroid for each cluster in the initial set of clusters,
        hashing, by the computer system, the centroids into a set of buckets,
        identifying a subset of the centroids that is hashed into the set of buckets into which a specified data vector from the dataset is hashed,
        determining a centroid from the subset of the centroids that is nearest to the specified data vector, and
        classifying the specified data vector into a first preliminary cluster, of the preliminary clusters, that corresponds to the centroid;
    redistributing, by the computer system, data vectors between at least two of the preliminary clusters to produce at least two redistributed clusters, the target data vector included in a first of the at least two redistributed clusters;
    transmitting, by the computer system, the first of the at least two redistributed clusters to a first computer system and a second of the at least two redistributed clusters to a second computer system;
    estimating, by the first computer system, a nearest neighbor of the target data vector within the first of the two redistributed clusters, wherein the nearest neighbor is one of multiple data vectors in the dataset that is most similar to the target data vector; and
    outputting, by the first computer system and in response to the request, information of the nearest neighbor to a user.

2. The computer-implemented method of claim 1, wherein determining a preliminary clustering comprises performing an iteration of a K-means routine.

3. The computer-implemented method of claim 2, wherein the K-means routine applies a locality sensitive hashing (LSH) function for determination of a nearest centroid.

4. The computer-implemented method of claim 3, wherein the LSH is parameterized by a number of projections m, a quantization factor w and a number of repetitions L, and hashes a query vector to a collection of buckets by:
    computing a first cost of hashing the query vector into a collection of buckets based on m;
    computing a second cost of searching the data vectors in the union of the buckets based on L; and
    determining a sum of the first cost and the second cost.

5. The computer-implemented method of claim 4, wherein:
    the first cost is proportional to a product of m and L; and
    the second cost is proportional to a product of L and an expected number of the data vectors that are hashed to a bucket to which the query vector is hashed with L equal to one.

6. The computer-implemented method of claim 1, wherein estimating a nearest neighbor comprises applying a LSH function.

7. The computer-implemented method of claim 1, further comprising identifying and compensating for at least one redundant vector prior to estimating the nearest neighbor of the target data vector.

8. The computer-implemented method of claim 7, wherein identifying at least one redundant vector comprises randomly selecting a corpus of data vectors from the data set and identifying at least two data vectors within the corpus sharing the same or similar values.

9. The computer-implemented method of claim 1, wherein redistributing data vectors comprises determining a cardinality and a second-closest centroid distance for a plurality of the preliminary clusters.

10. The computer-implemented method of claim 9, wherein redistributing data vectors comprises:
    determining a first preliminary cluster based upon a cardinality of the first preliminary cluster;
    determining a second preliminary cluster based upon a distance to a second-closest centroid of the second preliminary cluster;
    verifying that the cardinality of the first cluster and the cardinality of the second cluster correspond to a relation; and
    redistributing data vectors between the first and second preliminary clusters such that the cardinality of at least one of the clusters is reduced.

11. The computer-implemented method of claim 10, wherein verifying that the cardinality of the first preliminary cluster and the cardinality of the second preliminary cluster correspond to a relation comprises verifying that a ratio of the cardinalities of the first preliminary cluster and the second preliminary cluster does not exceed a threshold.

12. A computer-readable storage device comprising instructions for estimating a nearest neighbor to a target data vector in a dataset, the instructions comprising:
    instructions for receiving, by the computer system, a request to determine the nearest neighbor to the target data vector;
    instructions for determining, by the computer system, a preliminary clustering of the dataset, the preliminary clustering comprising a plurality of preliminary clusters, the determining including:
        for an initial set of clusters of the dataset, computing a centroid for each cluster in the initial set of clusters,
        hashing, by the computer system, the centroids into a set of buckets,
        identifying a subset of the centroids that is hashed into the set of buckets into which a specified data vector from the dataset is hashed, determining a centroid from the subset of the centroids that is nearest to the specified data vector, and classifying the specified data vector into a first preliminary cluster, of the preliminary clusters, that corresponds to the centroid;

instructions for redistributing data vectors between at least two of the preliminary clusters to produce at least two redistributed clusters, the target data vector included in a first of the at least two redistributed clusters;

instructions for transmitting, by the computer system, the first of the at least two redistributed clusters to a first computer system and a second of the at least two redistributed clusters to a second computer system;

instructions for estimating, by the first computer system, a nearest neighbor of the target data vector within the first of the two redistributed clusters, wherein the nearest neighbor indicates one of multiple data vectors in the dataset that is most similar to the target data vector; and instructions for outputting, by the first computer system and in response to the request, information of the nearest neighbor to a user.

13. The computer-readable storage device of claim 12, wherein determining a preliminary clustering comprises performing an iteration of the K-means routine.

14. The computer-readable storage device of claim 13, wherein the K-means routine applies a LSH function for determination of a nearest centroid.

15. The computer-readable storage device of claim 14, wherein the LSH is parameterized by a number of projections m, a quantization factor w and a number of repetitions L and hashes a query vector to a collection of buckets, the method comprising:

computing a first cost of hashing the query vector into a collection of buckets based on m;

computing a second cost of searching the data vectors in the union of the buckets based on L; and determining a sum of the first cost and the second cost.

16. The computer-readable storage device of claim 15, wherein:

the first cost is proportional to a product of m and L; and the second cost is proportional to a product of L and an expected number of the data vectors that are hashed to a bucket to which the query vector is hashed with L equal to one.

17. The computer-readable storage device of claim 12, wherein estimating a nearest neighbor comprises applying a LSH function.

18. The computer-readable storage device of claim 12, further comprising instructions for identifying and compensating for at least one redundant vector prior to estimating the nearest neighbor of the target data vector.

19. The computer-readable storage device of claim 18, wherein identifying at least one redundant vector comprises randomly selecting a corpus of data vectors from the data set and identifying at least two data vectors within the corpus sharing the same or similar values.

20. The computer-readable storage device of claim 12, wherein redistributing data vectors comprises determining a cardinality and a second-closest centroid distance for a plurality of the preliminary clusters.

21. The computer-readable storage device of claim 20, wherein redistributing data vectors comprises:

determining a first preliminary cluster based upon a cardinality of the first preliminary cluster;

determining a second preliminary cluster based upon a distance to a second-closest centroid of the second preliminary cluster;

verifying that the cardinality of the first cluster and the cardinality of the second cluster correspond to a relation; and redistributing data vectors between the first and second preliminary clusters such that the cardinality of at least one of the clusters is reduced.

22. The computer-readable storage device of claim 21, wherein verifying that the cardinality of the first preliminary cluster and the cardinality of the second preliminary cluster correspond to a relation comprises verifying that a ratio of the cardinalities of the first preliminary cluster and the second preliminary cluster does not exceed a threshold.

23. A system for estimating a nearest neighbor to a target data vector in a dataset, comprising:

a component configured to receive a request to determine the nearest neighbor to the target data vector;

a component configured to determine a preliminary clustering of the dataset, the preliminary clustering comprising a plurality of preliminary clusters, the component further configured to determine by the preliminary clustering by:

for an initial set of clusters of the dataset, computing a centroid for each cluster in the initial set of clusters, hashing, by the computer system, the centroids into a set of buckets, identifying a subset of the centroids that is hashed into the set of buckets into which a specified data vector from the dataset is hashed, determining a centroid from the subset of the centroids that is nearest to the specified data vector, and classifying the specified data vector into a first preliminary cluster, of the preliminary clusters, that corresponds to the centroid;

a component configured to redistribute data vectors between at least two of the preliminary clusters to produce two redistributed clusters, the target data vector included in a first of the two redistributed clusters;

a component configured to transmit the first of the at least two redistributed clusters to a first computer system and a second of the at least two redistributed clusters to a second computer system;

a component configured to estimate a nearest neighbor of the target data vector within the first of the two redistributed clusters, wherein the nearest neighbor is one of multiple data vectors in the dataset that is most similar to the target data vector; and a component configured to output, by the first computer system and in response to the request, information of the nearest neighbor to a user.

24. The system of claim 23, wherein the preliminary clustering is determined by performing an iteration of the K-means routine.

25. The system of claim 24, wherein the K-means routine applies a LSH function for determination of a nearest centroid.

26. The system of claim 25, wherein the LSH is parameterized by a number of projections m, a quantization factor w and a number of repetitions L and hashes a query vector to a collection of buckets, by:

computing a first cost of hashing the query vector into a collection of buckets based on m;

computing a second cost of searching the data vectors in the union of the buckets based on L; and determining a sum of the first cost and the second cost.

27. The system of claim 26, wherein:
the first cost is proportional to a product of m and L; and
the second cost is proportional to a product of L and an expected number of the data vectors that are hashed to a bucket to which the query vector is hashed with L equal to one.

28. The system of claim 23, wherein the nearest neighbor is estimated by applying a LSH function.

29. The system of claim 23, further comprising a component configured to identify and compensate for at least one redundant vector prior to estimating the nearest neighbor of the target data vector.

30. The system of claim 29, wherein the at least one redundant vector is identified by randomly selecting a corpus of data vectors from the data set and identifying at least two data vectors within the corpus sharing the same or similar values.

31. The system of claim 23, wherein the data vectors are redistributed by determining a cardinality and a second-closest centroid distance for a plurality of the preliminary clusters.

32. The system of claim 31, wherein the data vectors are redistributed by:
determining a first preliminary cluster based upon a cardinality of the first preliminary cluster;
determining a second preliminary cluster based upon a distance to a second-closest centroid of the second preliminary cluster;
verifying that the cardinality of the first cluster and the cardinality of the second cluster correspond to a relation; and
redistributing data vectors between the first and second preliminary clusters such that the cardinality of at least one of the clusters is reduced.

33. The system of claim 32, wherein it is verified that the cardinality of the first preliminary cluster and the cardinality of the second preliminary cluster correspond to a relation by verifying that a ratio of the cardinalities of the first preliminary cluster and the second preliminary cluster does not exceed a threshold.

* * * * *